(12) United States Patent
Choung (10) Patent No.: US 10,803,349 B2
(45) Date of Patent: Oct. 13, 2020

(54) APPARATUS AND METHOD FOR DETERMINING TASTE OF USER BASED ON LATENT VARIABLE

(71) Applicant: MABLIC CORPORATION, Seoul (KR)

(72) Inventor: Yun Sik Choung, Seoul (KR)

(73) Assignee: MABLIC CORPORATION, Seoul (KR)

( * ) Notice: Subject to any disclaimer, the term of this patent is extended or adjusted under 35 U.S.C. 154(b) by 0 days.

(21) Appl. No.: 16/685,234

(22) Filed: Nov. 15, 2019

(65) Prior Publication Data
US 2020/0184258 A1    Jun. 11, 2020

(30) Foreign Application Priority Data

Dec. 11, 2018    (KR) ........................ 10-2018-0159026

(51) Int. Cl.
*G06K 9/62*    (2006.01)
*G06N 5/04*    (2006.01)
(Continued)

(52) U.S. Cl.
CPC ......... *G06K 9/6223* (2013.01); *G06K 9/6272* (2013.01); *G06N 5/04* (2013.01); *G06Q 30/0282* (2013.01); *G06Q 30/0631* (2013.01)

(58) Field of Classification Search
CPC ...... G06K 9/6223; G06K 9/6272; G06N 5/04; G06Q 30/0282; G06Q 30/0631
See application file for complete search history.

(56) References Cited

U.S. PATENT DOCUMENTS

| | | | | |
|---|---|---|---|---|
| 8,751,429 | B2 * | 6/2014 | Dillon ...................... | G06N 5/02 706/46 |
| 2016/0171514 | A1 * | 6/2016 | Frank ...................... | G06Q 50/12 705/7.29 |
| 2018/0121631 | A1 * | 5/2018 | Mehta .................... | G16H 50/30 |

FOREIGN PATENT DOCUMENTS

KR    1020170132375    12/2016

OTHER PUBLICATIONS

Gayatree Ganu, Yogesh Kakodkar, and Amelie Marian, "Improving the quality of predictions using textual information in online user reviews", Mar. 13, 2012, Information Systems 38 (2013), pp. 1-15. (Year: 2012).*

(Continued)

*Primary Examiner* — Kamran Afshar
*Assistant Examiner* — Ying Yu Chen
(74) *Attorney, Agent, or Firm* — IPLA P.A.; James E. Bame (57)    ABSTRACT

Provided is a latent variable based taste determination method of determining including acquiring, by a computing apparatus, a response of the user on a plurality of questions associated with one of a plurality of areas including a gustatory area, a food ingredient area, and a restaurant environment area, or supporting another apparatus interacting with the computing apparatus to acquire the response; extracting, by the computing apparatus, independent latent variables representing taste load of the user in each of the plurality of areas, based on the response; extracting, by the computing apparatus, p hidden variables representing a correlation between the independent latent variables using a pretrained estimation model; and determining the taste of the user by comparing, by the computing apparatus, Euclidean distances between the hidden variables of the user and (Continued)

centroids of pre-grouped k taste groups. Here, each of p and k denotes a natural number of 1 or more.

5 Claims, 6 Drawing Sheets

(51) Int. Cl.
*G06Q 30/02* (2012.01)
*G06Q 30/06* (2012.01)

(56) References Cited

OTHER PUBLICATIONS

Liwei Liu, Nikolay Mehandjiev, and Dong-Ling Xu. "Multi-Criteria Service Recommendation Based on User Criteria Preferences", Oct. 2011, RecSys'11, pp. 77-84. (Year: 2011).*

* cited by examiner

FIG. 5

APPARATUS AND METHOD FOR DETERMINING TASTE OF USER BASED ON LATENT VARIABLE

CROSS-REFERENCE

This application claims priority from and the benefit of Korean Patent Application No. 10-2018-0159026 filed on Dec. 11, 2018, which is hereby incorporated by reference in its entirety.

BACKGROUND

The following description relates to an apparatus and method for determining a taste of a user, and more particularly, to an apparatus and method for determining a taste of a user based on a latent variable that describes the taste of the user.

Currently, various applications are being developed to recommend foods or restaurants based on bigdata. However, such conventional solutions have some constraints in that the solutions merely use reviews of experts and general users about a specific dish or restaurant and thus, unique inclinations or eating habits and tastes of individual users are not applied. In the related art, although a plurality of evaluations and reviews on a food or a restaurant is provided, a user who actually performs an evaluation and a user to which the food or the restaurant is recommended may have different personal characteristics. In this case, accurate information is not provided.

For example, a method and apparatus for recommending a location-based service provider is disclosed in Korean Patent Registration No. 10-1832398. In detail, a configuration of calculating attitude scores of a user visiting a specific store, predicting preferences of other users having a relatively high similarity, and generating service provider recommendation information is provided. However, there is no technical spirit related to a configuration of calculating a latent variable based on a response of a user on a gustatory area, a food ingredient area, and a restaurant environment area and determining a taste of the user based on the calculated latent variable.

SUMMARY OF THE INVENTION

At least one example embodiment provides a taste determination apparatus and method that may analyze a unique taste of each user based on a latent variable and may categorize the analyzed taste of each user.

According to an aspect, there is provided a method (hereinafter, also referred to as a latent variable based taste determination method) of determining a taste of a user based on a latent variable that describes the taste of the user. The latent variable based taste determination method includes (a) acquiring, by a computing apparatus, a response of the user on a plurality of questions associated with one of a plurality of areas including a gustatory area, a food ingredient area, and a restaurant environment area, or supporting another apparatus interacting with the computing apparatus to acquire the response; (b) extracting, by the computing apparatus, independent latent variables representing taste load of the user in each of the plurality of areas, based on the response; (c) extracting, by the computing apparatus, p hidden variables representing a correlation between the independent latent variables using a pretrained estimation model, where p denotes a natural number of 1 or more; and (d) determining, by the computing apparatus, the taste of the user by comparing Euclidean distances between the hidden variables of the user and centroids of pre-grouped k taste groups, where k denotes a natural number of 1 or more.

The pre-grouped k taste groups may be generated by performing (e1) generating a first group in which a value of a first hidden variable among the p hidden variables is less than −1, a second group in which the value of the first hidden variable is greater than or equal to −1 and less than or equal to 1, and a third group in which the value of the first hidden variable is greater than 1 based on response values of a plurality of users; (e2) repeating the (e1) with respect to each of the p hidden variables; and (e3) calculating $S_i$ that minimizes a whole dispersion according to Equation 5 with respect to the $k=3^p$ taste groups that are generated by the (e2).

$$V = \sum_{i=1}^{3^p} \sum_{j \in S_i} |x_j - \mu_i|^2 \qquad \text{[Equation 5]}$$

In Equation 5, i denotes an index that represents each of the taste groups, $S_i$ denotes a set of users included in an i-th taste group, $x_j$ denotes a response value of a j-th user included in $S_i$, and $\mu_i$ denotes an average response value of users included in $S_i$.

The (d) may include (d1) calculating, as a cost function, a sum of squares of a Euclidean distance between a centroid of each of the pre-grouped k taste groups and coordinates defined by the p hidden variables of the user; and (d2) determining a taste group of the user that minimizes the cost function as one of the pre-grouped k taste groups.

The (d) may further include (d3) determining a final taste group of the user based on avoiding food ingredient information and avoiding food information acquired from the user and the taste group determined in the (d2).

According to another aspect, there is provided a non-transitory computer-readable recording medium storing computer instructions that, when executed by a processor, cause the processor to perform the latent variable based taste determination method.

According to another aspect, there is provided an apparatus (hereinafter, also referred to as a latent variable based taste determination apparatus) for determining a taste of a user based on a latent variable that describes the taste of the user. The latent variable based taste determination apparatus includes a communicator configured to acquire a response of the user on a plurality of questions associated with one of a plurality of areas including a gustatory area, a food ingredient area, and a restaurant environment area; and a processor configured to perform (i) a process of extracting independent latent variables representing taste load of the user in each of the plurality of areas, based on the response, (ii) a process of extracting p hidden variables representing a correlation between the independent latent variables using a pretrained estimation model, where p denotes a natural number of 1 or more, and (iii) a process of determining the taste of the user by comparing Euclidean distances between the hidden variables of the user and centroids of pre-grouped k taste groups, where k denotes a natural number of 1 or more.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Example embodiments will be described in more detail with regard to the figures, wherein like reference numerals refer to like parts throughout the various figures unless otherwise specified, and wherein.

DETAILED DESCRIPTION OF THE INVENTION

Various modifications and changes may be made to the present disclosure and the disclosure may include various example embodiments. Specific example embodiments are described in detail with reference to the accompanying drawings. The example embodiments, however, may be embodied in various different forms, and should not be construed as being limited to only the specific example embodiments. Rather, the example embodiments should be understood to include all of the modifications, equivalents, and substitutions included in the spirit and technical scope of the disclosure.

Although the terms "first", "second", etc., may be used herein to describe various components, the components should not be limited by these terms. These terms are only used to distinguish one component from another component. For example, a first component may also be termed a second component and, likewise, a second component may be termed a first component, without departing from the scope of this disclosure.

When a component is referred to as being "connected to" or "coupled to" another component, the component may be directly connected to or coupled to the other component, or one or more other intervening components may be present. In contrast, when a component is referred to as being "directly connected to" or "directly coupled to", there is no intervening component.

The terms used herein are used to simply explain specific example embodiments and are not construed to limit the present disclosure. The singular forms "a", "an", and "the", are intended to include the plural forms as well, unless the context clearly indicates otherwise. It will be further understood that the terms "comprises/comprising," and "has/having" when used in this specification, specify the presence of stated features, integers, steps, operations, elements, and/or components, but do not preclude the presence or addition of one or more other features, integers, steps, operations, elements, components, and/or groups, thereof.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Hereinafter, example embodiments will be described in detail with reference to the accompanying drawings. For simplicity of description and general understanding of the disclosure, like reference numerals refer to like components throughout the present specification although they are illustrated in different drawings.

Figure 1:
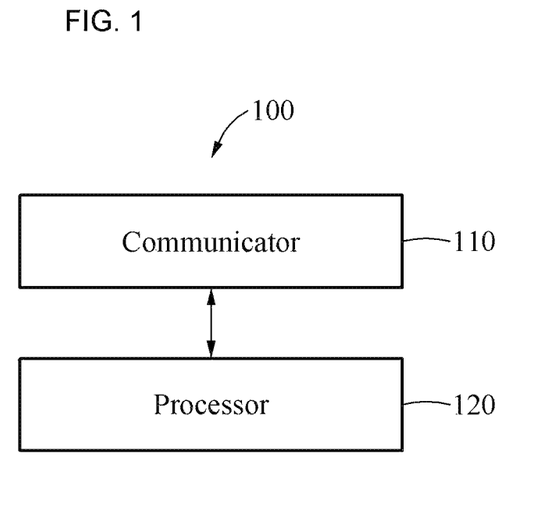
FIG. 1 is a block diagram illustrating an example of a computing apparatus configured to perform a method (hereinafter, a latent variable based taste determination method) of determining a taste of a user based on a latent variable that describes the taste of the user according to an example embodiment.

FIG. 1 is a block diagram illustrating an example of a computing apparatus configured to perform a method (hereinafter, a latent variable based taste determination method) of determining a taste of a user based on a latent variable that describes the taste of the user according to an example embodiment. Referring to FIG. 1, a computing apparatus 100 may include a communicator 110 and a processor 120, and may directly or indirectly communicate with another computing apparatus (not shown) through the communicator 110. The communicator 110 may include a communication interface. For example, the communication interface may include a wireless Internet interface, such as, for example, a wireless local area network (WLAN), wireless fidelity (WiFi) direct, digital living network alliance (DLNA), wireless broadband (WiBro), world interoperability for microwave access (WiMAX), high speed downlink packet access (HSDPA), etc., and a near field communication interface, such as, for example, Bluetooth™, radio frequency identification (RFID), infrared data association (IrDA), ultra wideband (UWB), ZigBee, near field communication (NFC), etc. In addition, the communication interface may represent any type of interfaces, for example, a wired interface, capable of performing communication with an outside.

In detail, the computing apparatus 100 may achieve a desired system performance using a combination of typical computer hardware (e.g., an apparatus including a computer processor, a memory, a storage, an input device and output device, components of other existing computing apparatuses; an electronic communication apparatus, such as a router, a switch, etc.; an electronic information storage system such as a network-attached storage (NAS) and a storage area network (SAN)) and computer software (e.g., instructions that cause a computing apparatus to function in a specific manner.

The communicator 110 of the computing apparatus 100 is capable of transmitting and receiving a request and a response to and from another interacting computing apparatus. For example, the request and the response may be transmitted and received through the same transmission control protocol (TCP) session. However, it is provided as an example only. For example, the request and the response may be transmitted and received as a user data protocol (UDP) datagram. Further, to receive a command or an instruction, the communicator 110 may include, for example, a keyboard, a mouse, and other external input devices, and may also include, for example, a printer, a display, and other external output devices.

The processor 120 of the computing apparatus 100 may further include a hardware configuration, such as, for example, a micro processing unit (MCU), a central processing unit (CPU), a graphics processing unit (GPU), a neural processing unit (NPU) or a tensor processing unit (TPU), a cache memory, a data bus, etc. Also, the processor 120 may further include a software configuration, such as, for example, an operating system (OS), an application that performs a specific purpose, etc.

The communicator 110 may acquire a response of the user on a plurality of questions associated with one of a plurality of areas including a gustatory area, a food ingredient area, and a restaurant environment area. Also, the processor 120 may perform (i) a process of extracting independent latent variables representing taste load of the user in each of the plurality of areas, based on the response, (ii) a process of extracting p (a natural number of 1 or more) hidden variables representing a correlation between the independent latent variables using a pretrained estimation model, and (iii) a process of determining the taste of the user by comparing Euclidean distances between the hidden variables of the user and centroids of pre-grouped k (a natural number of 1 or more) taste groups. Hereinafter, a process of categorizing a unique taste of a user according to an example embodiment is further described with reference to the accompanying drawings.

Response Acquisition Process with Respect to a Plurality of Areas

Figure 2A:
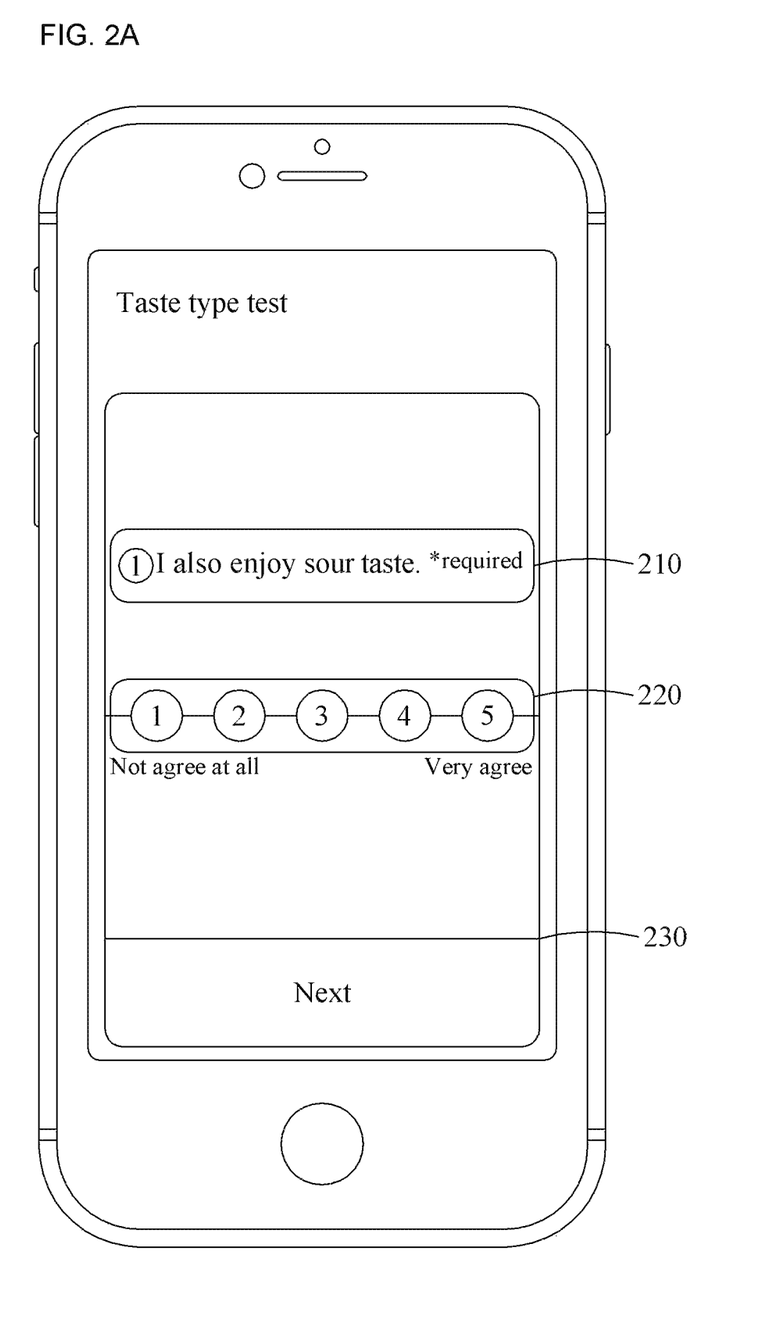
FIGS. 2A and 2B illustrate examples of acquiring a response used to extract a latent variable with respect to a taste of a user according to an example embodiment.

FIGS. 2A and 2B illustrate examples of acquiring a response used to extract a latent variable with respect to a taste of a user according to an example embodiment. A computing apparatus that performs a latent variable based determination method according to an example embodiment may output, that is, display a screen of FIG. 2A on a display. Referring to FIG. 2A, the computing apparatus may display a first graphic object 210, a second graphic object 220, and a third graphic object 230. The first graphic object 210 may include a question associated with one of a plurality of areas including a gustatory area, a food ingredient area, and a restaurant environment area. In the following description, the gustatory area may refer to a sensory area associated with sweet, bitter, sour, salty, umami, oily, spicy (smelling), flavor, and preference for seasonal food. Also, the food ingredient area may refer to an area for examining a user preference with respect to a material constituting food, such as, for example, meat, fish, vegetables, and fruits. Also, the restaurant environment area may refer to an area for examining a user preference with respect to an environment of a restaurant, such as, for example, a cleanliness level of the restaurant, a physical distance from the restaurant, the atmosphere of the restaurant, and the like. Here, although the first graphic object 210 includes a question about the gustatory area, "I also enjoy sour taste", embodiments including a question about the food ingredient area and the restaurant environment area, such as "I enjoy eating meat" or "I don't go if the restaurant is shabby" may be implemented.

The second graphic object 220 refers to a graphic object for acquiring a response of the user to the displayed question. The user may input the response to the displayed question through interaction with the second graphic object 220 displayed on the screen. The interaction with the second graphic object 220 may be implemented through an input device, such as, for example, a mouse and a keyboard, and may be implemented through a contact of the user on a display screen. The computing apparatus may numerically represent the user preference on a plurality of areas, for example, the gustatory area, the food ingredient area, and the restaurant environment area, using the second graphic object 220.

The third graphic object 230 refers to a graphic object that assists the user to switch a screen to input a response to a next question.

Figure 2B:
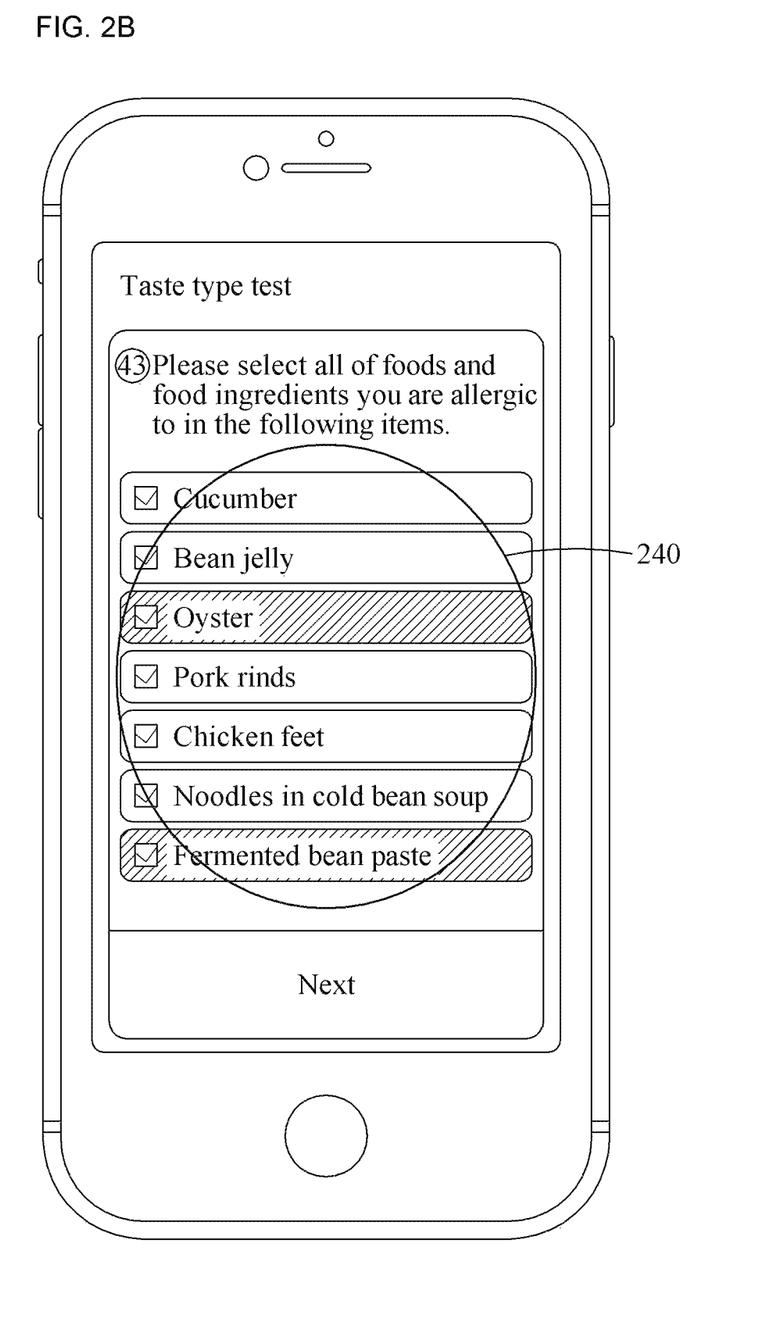

Referring to FIG. 2B, the computing apparatus may display a fourth graphic object 240 to acquire a response to a question from the user. The user may input, to the computing apparatus, food and food ingredients that the user is personally allergic to or does not eat as a response value through interaction with the fourth graphic object 240 displayed on the screen.

Extraction of Independent Latent Variable and Hidden Variable

Figure 3:
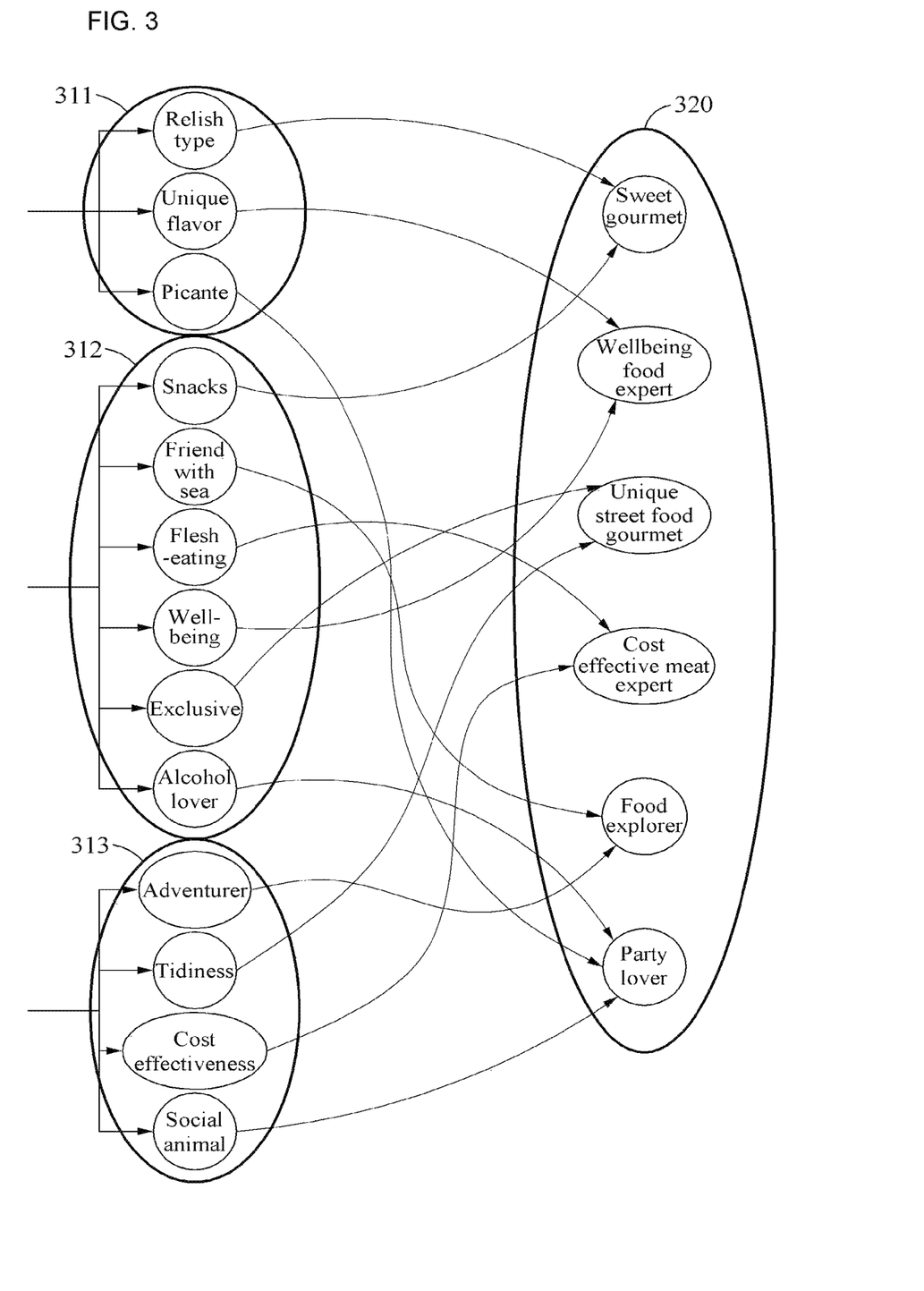
FIG. 3 illustrates an example of a process of extracting an independent latent variable and a hidden variable from a response of a user according to an example embodiment.

FIG. 3 illustrates an example of a process of extracting an independent latent variable and a hidden variable from a response of a user according to an example embodiment. Referring to FIG. 3, a process of extracting, by a computing apparatus performing a latent variable based taste determination method, an independent latent variable and a hidden variable is visualized.

The computing apparatus may extract independent latent variables 311, 312, and 313 representing taste load of the user in each of a plurality of areas, based on a response acquired from the user. In detail, the first independent latent variable 311 refers to a latent variable that represents taste load of the user for a gustatory area, the second independent latent variable 312 refers to a latent variable that represents taste load of the user for a food ingredient area, and the third independent latent variable 313 refers to a latent variable that represents taste load of the user for a restaurant environment area.

The computing apparatus may extract the first independent latent variable 311 for the gustatory area using an analysis model according to the following Equation 1.

$$x_{ij} = \lambda_{jk} t_{jk} + u_{ij} \qquad \text{[Equation 1]}$$

In Equation 1, $x_{ij}$ denotes scores acquired by standardizing a response value of an i-th user for a j-th question, $\lambda_{jk}$ denotes taste factor load that the response value for the j-th question has for a k-th first independent latent variable, $t_{jk}$ denotes the k-th first independent latent variable (corresponding to the gustatory area) for a j-th response value, and $u_{ij}$ denotes a value that is not described by other common factors, that is, denotes a specialty constant for the j-th response value of the i-th user. Through Equation 1, the computing apparatus may describe the respective response values acquired from the i-th user using the k first independent latent variables 311 associated with the gustatory area. Here, k denotes a natural number of 1 or more.

Likewise, the computing apparatus may extract the second independent latent variable 312 representing taste load of the user for the food ingredient area and the third independent latent variable 313 representing taste load of the user for the restaurant environment area using the analysis model according to the following Equation 2 and Equation 3, respectively.

$$x_{ij} = \lambda_{jm} g_{jm} + u_{ij} \qquad \text{[Equation 2]}$$

In Equation 2, $g_{jm}$ denotes an m-th second independent latent variable (corresponding to the food ingredient area) that affects the j-th response value of the i-th user, and $\lambda_{jm}$ denotes taste factor load that the response value for the j-th question has for the m-th second independent latent variable. Through Equation 2, the computing apparatus may describe the respective response values acquired from the i-th user using the m second independent latent variables 312 associated with the food ingredient area. Here, m denotes a natural number of 1 or more.

$$x_{ij} = \lambda_{jn} e_{jn} + u_{ij} \qquad \text{[Equation 3]}$$

In Equation 3, $e_{jn}$ denotes an n-th third independent latent variable (corresponding to the restaurant environment area)

for the j-th response value of the i-th user, and $\lambda_{jn}$ denotes taste factor load that the response value for the j-th question has for the n-th third independent latent variable. Through Equation 3, the computing apparatus may describe the respective response values acquired from the i-th user using the n third independent latent variables 313 associated with the restaurant environment area. Here, n denotes a natural number of 1 or more.

Although FIG. 3 illustrates an example embodiment in which 3 first independent latent variables 311, 6 second independent latent variables 312, and 4 third independent latent variables 313 are extracted, it is provided as an example only and is not construed as limiting or restricting other example embodiments.

The analysis model as represented by Equation 1 to Equation 3 may be generated based on bigdata acquired from a plurality of users. For example, the analysis model may be generated based on factor analysis. Herein, the computing apparatus may extract latent variables about abstract factors, such as taste and preference for restaurant, and may statistically categorize taste of users based on bigdata.

Also, the computing apparatus may extract p hidden variables representing a correlation between the independent latent variables 311, 312, and 313 using a pre-trained estimation model. Here, p denotes a natural number of 1 or more. The computing apparatus may extract a hidden variable that describes a mutual relationship between independent latent variables extracted from at least three areas, for example, the gustatory area, the food ingredient area, and the restaurant environment area, explaining different concepts. In detail, the computing apparatus may extract a hidden variable using an analysis model as represented by the following Equation 4.

$$x_{il} = \lambda_{lp} y_{lp} + u_{il} \quad \text{[Equation 4]}$$

In Equation 4, $x_{il}$ denotes an l-th independent latent variable of the i-th user, $\lambda_{lp}$ denotes load of the l-th independent latent variable for a p-th hidden variable, $y_{lp}$ denotes a p-th hidden variable of an l-th user, and $u_{il}$ denotes a specialty constant that is not described by other hidden variables, that is, a non-observable numerical value that affects only the i-th user.

In the example embodiment of FIG. 3, the computing apparatus extracts 6 hidden variables 320 representing a correlation between the independent latent variables 311, 312, and 313. Here, a number of hidden variables 320 is provided as an example only and accordingly, is not construed as limiting or restricting other example embodiments. For example, 10 or 20 hidden variables may be extracted.

Taste Determination Process

Figure 4:
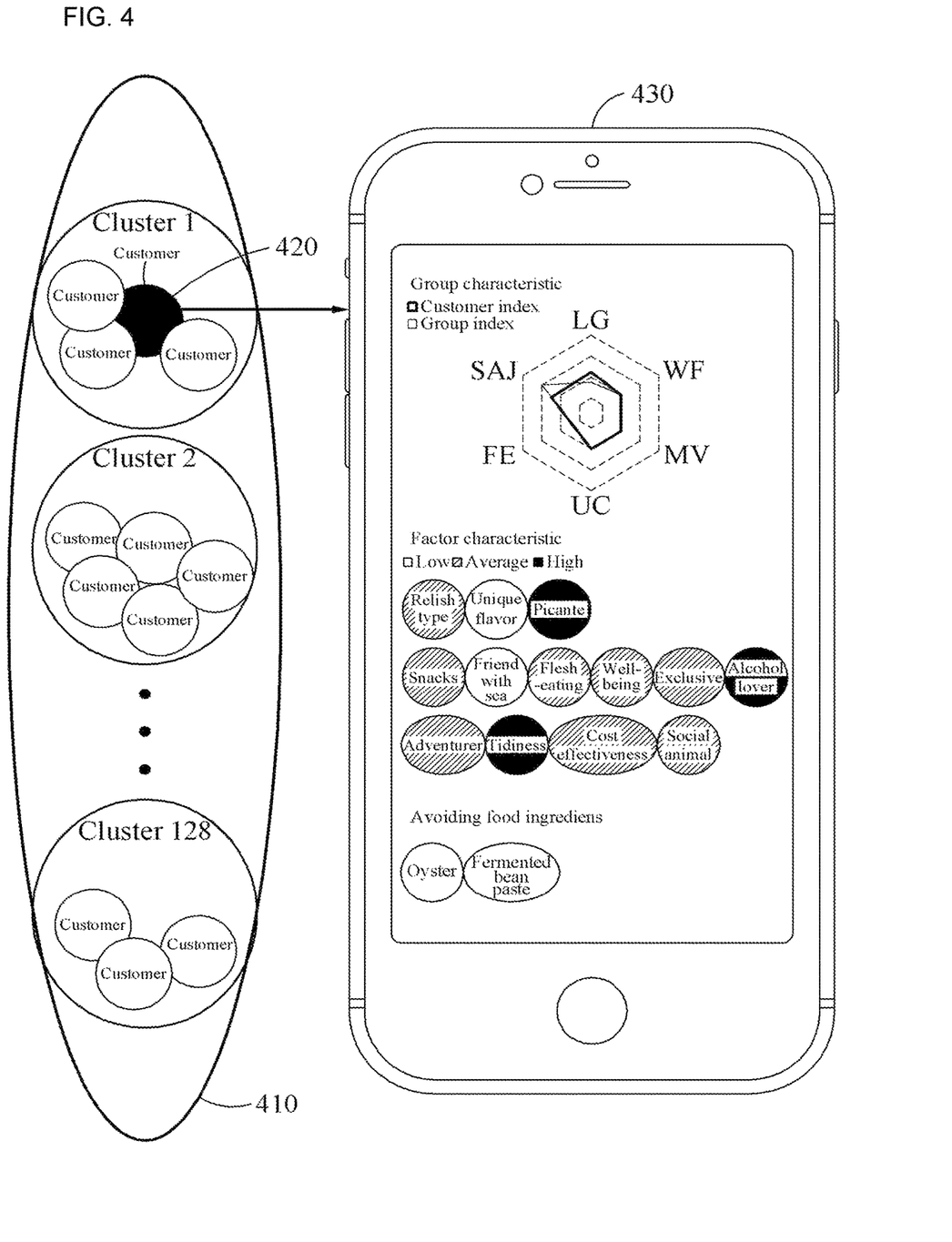
FIG. 4 illustrates an example of a process of determining, by a computing apparatus, a taste of a user as one of pre-grouped k taste groups according to an example embodiment.

FIG. 4 illustrates an example of a process of determining, by a computing apparatus, a taste of a user as one of pre-grouped k taste groups according to an example embodiment. Referring to FIG. 4, the computing apparatus may determine a taste type of a specific customer 420 as a first cluster among pre-grouped k taste groups 410. In detail, the computing apparatus may calculate, as a cost function, a sum of squares of a Euclidean distance between a centroid of each of the pre-grouped k taste groups 410 and coordinates defined by p hidden variables of the specific customer 420. Also, the computing apparatus may determine a taste group of the specific customer 420 that minimizes the cost function as one of the pre-grouped k taste groups 410. Also, the computing apparatus may determine a final taste group of the specific customer 420 based on avoiding food ingredient information and avoiding food information acquired from the specific customer 420 and the determined taste group.

Although FIG. 4 illustrates that 128 taste groups are pre-grouped, it is provided as an example only. It will be apparent to those skilled in the art that various modifications, such as, for example, 64 and 100 pre-grouped taste groups, may be applied.

The computing apparatus may pre-group k taste group by using response values of a plurality of users as bigdata. In detail, the computing apparatus may generate a first group in which a value of a first hidden variable among the p hidden variables is less than −1, a second group in which the value of the first hidden variable is greater than or equal to −1 and less than or equal to 1, and a third group in which the value of the first hidden variable is greater than 1 based on the response values of the plurality of users. In this manner, the computing apparatus may repeat a process of generating three groups with respect to each of the p hidden variables. Also, the computing apparatus may calculate $S_i$ that minimizes a whole dispersion according to Equation 5 with respect to $k=3^p$ taste groups that are generated through the aforementioned operations.

$$V = \sum_{i=1}^{3^p} \sum_{j \in S_i} |x_j - \mu_i|^2 \quad \text{[Equation 5]}$$

In Equation 5, i denotes an index that represents each of the taste groups, $S_i$ denotes a set of users included in an i-th taste group, $x_j$ denotes a response value of a j-th user included in $S_i$, and $\mu_i$ denotes an average response value of users included in $S_i$.

Also, the computing apparatus may visualize hidden variables representing a taste of the specific customer 420 and may provide the visualized hidden variables to the user. The computing apparatus may output information indicating a taste type of the specific customer 420 through a user interface 430. The computing apparatus may provide the user with semantic information of a corresponding hidden variable, for example, "Spicy" with respect to a hidden variable of desired scores or more through the user interface 430. Likewise, the computing apparatus may provide the user with semantic information of a corresponding hidden variable, for example, "Friend with sea" with respect to a hidden variable of desired scores or less through the user interface 430. Also, the computing apparatus may output food ingredient information avoided by the specific customer 420, for example, "Oyster" and "Fermented bean paste" through the user interface 430.

Figure 5:
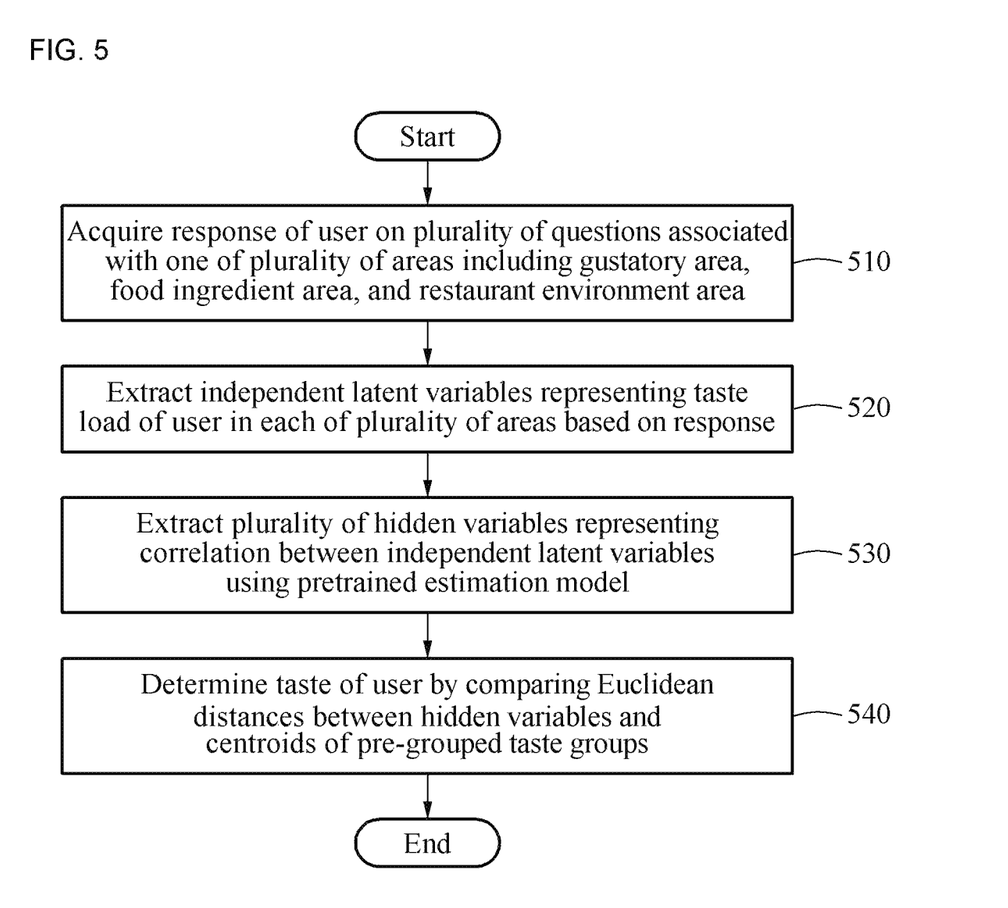
FIG. 5 is a flowchart illustrating an example of a latent variable based taste determination method according to an example embodiment.

FIG. 5 is a flowchart illustrating an example of a latent variable based taste determination method according to an example embodiment. Referring to FIG. 5, the latent variable based taste determination method may include operation 510 of acquiring a response of a user on a plurality of questions associated with one of a plurality of areas including a gustatory area, a food ingredient area, and a restaurant environment area, operation 520 of extracting independent latent variables representing taste load of the user in each of the plurality of areas, based on the response, operation 530 of extracting a plurality of hidden variables representing a correlation between the independent latent variables using a pretrained estimation model, and operation 540 of determining the taste of the user by comparing Euclidean distances between the hidden variables of the user and centroids of pre-grouped taste groups.

In operation 510, the computing apparatus may acquire the response of the user on the plurality of questions. In one example embodiment, the computing apparatus may display a plurality of questions associated with one of a plurality of areas including a gustatory area, a food ingredient area, and a restaurant environment area on a display, and may acquire a response value of the user for the displayed questions. The response value of the user represents a numerical value that is input from the user on a question displayed on the display, which is similar to a method of numerically representing "Not agree at all" as a natural number of "1" and "Very agree" as a natural number of "5" with respect to a single question. For example, the computing apparatus may display a question "Do you like oily food such as fried dish?" and may acquire a numerically represented response value of the user on the question. As another example embodiment, the computing apparatus may provide an information code, for example, a uniform resource locator (URL), to another computing apparatus and may acquire a response of the user from the other computing apparatus in a wireless transmission manner or a wired transmission manner.

In operation 520, the computing apparatus may extract independent latent variables representing taste load of the user in each of the plurality of areas, based on the response. The aforementioned description may apply to a process of extracting independent latent variables and thus, a further description is omitted.

In operation 530, the computing apparatus may extract the plurality of hidden variables representing the correlation between the independent latent variables using the pre-trained estimation model. The estimation model may provide a machine trained result to represent the correlation between the independent latent variables by using response values of a plurality of users as bigdata.

In operation 540, the computing apparatus may determine the taste of the user by comparing Euclidean distances between the hidden variables of the user and centroids of pre-grouped plurality of taste groups. Further, the computing apparatus may determine a final taste group of the user by further using avoiding food ingredient information and avoiding food information.

The example embodiments described above may be implemented using hardware components, software components, and/or a combination thereof. For example, the apparatuses, the methods, and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to the above-described example embodiments may be recorded in non-transitory computer-readable media including program instructions to implement various operations of the above-described example embodiments. The media may also include, alone or in combination with the program instructions, data files, data structures, and the like. The media may continuously store a program executable by a computer or may temporarily store or the program for execution or download. Also, the media may be various types of recording devices or storage devices in which a single piece or a plurality of pieces of hardware may be distributed over a network without being limited to a medium directly connected to a computer system. Examples of the media include magnetic media such as hard disks, floppy disks, and magnetic tapes; optical media such as CD-ROM discs and DVDs; magneto-optical media such as floptical disks; and hardware devices that are specially configured to store and perform program instructions, such as read-only memory (ROM), random access memory (RAM), flash memory, and the like. Examples of other media may include recording media and storage media managed at Appstore that distributes applications or sites and servers that supply and distribute various types of software. Examples of program instructions include both machine code, such as produced by a compiler, and files containing higher level code that may be executed by the computer using an interpreter. The hardware devices may be configured to operate as at least one software module to perform operations of example embodiments, or vice versa.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of determining a taste of a user based on a latent variable that describes the taste of the user, the method comprising:

(a) acquiring, by a computing apparatus, a response of the user on a plurality of questions associated with one of a plurality of areas including a gustatory area, a food ingredient area, and a restaurant environment area, or supporting another apparatus interacting with the computing apparatus to acquire the response;

(b) extracting, by the computing apparatus, independent latent variables representing taste load of the user in each of the plurality of areas, based on the response;

(c) extracting, by the computing apparatus, p hidden variables representing a correlation between the independent latent variables using a pretrained estimation model, wherein the pretrained estimation model provides a machine trained result to represent the correlation between the independent latent variables, where p denotes a natural number of 1 or more;

(d) determining, by the computing apparatus, the taste of the user by comparing Euclidean distances between the hidden variables of the user and centroids of pre-grouped k taste groups, where k denotes a natural number of 1 or more;

(e) displaying the taste of the user;

(f1) generating a first group in which a value of a first hidden variable among the p hidden variables is less than −1, a second group in which the value of the first hidden variable is greater than or equal to −1 and less than or equal to 1, and a third group in which the value of the first hidden variable is greater than 1 based on response values of a plurality of users;

(f2) repeating the (f1) with respect to each of the p hidden variables; and (f3) calculating $S_i$ that minimizes response values of a plurality of users according to Equation 5 with respect to the $k=3^P$ taste groups that are generated by the (f2), $$V = \sum_{i=1}^{3^P} \sum_{j \in S_i} |x_j - \mu_i|^2 \quad \text{[Equation 5]}$$

where V denotes the response values, i denotes an index that represents each of the taste groups, $S_i$ denotes a set of users included in an i-th taste group, $x_j$ denotes a response value of a j-th user included in $S_i$, and $\mu_i$ denotes an average response value of users included in $S_i$.

2. The method of claim 1, wherein the (d) comprises:

(d1) calculating, as a cost function, a sum of squares of a Euclidean distance between a centroid of each of the pre-grouped k taste groups and coordinates defined by the p hidden variables of the user; and (d2) determining a taste group of the user that minimizes the cost function as one of the pre-grouped k taste groups.

3. The method of claim 2, wherein the (d) further comprises:

(d3) determining a final taste group of the user based on avoiding food ingredient information and avoiding food information acquired from the user and the taste group determined in the (d2).

4. A non-transitory computer-readable recording medium storing computer instructions that, when executed by a processor, cause the processor to perform the method of claim 1.

5. An apparatus for determining a taste of a user based on a latent variable that describes the taste of the user, the apparatus comprising:

a hardware communicator configured to acquire a response of the user on a plurality of questions associated with one of a plurality of areas including a gustatory area, a food ingredient area, and a restaurant environment area; and a processor configured to perform (i) a process of extracting independent latent variables representing taste load of the user in each of the plurality of areas, based on the response, (ii) a process of extracting p hidden variables representing a correlation between the independent latent variables using a pretrained estimation model, wherein the pretrained estimation model provides a machine trained result to represent the correlation between the independent latent variables, where p denotes a natural number of 1 or more, and (iii) a process of determining the taste of the user by comparing Euclidean distances between the hidden variables of the user and centroids of pre-grouped k taste groups, where k denotes a natural number of 1 or more, (iv) displaying the taste of the user, (v) generating a first group in which a value of a first hidden variable among the p hidden variables is less than −1, a second group in which the value of the first hidden variable is greater than or equal to −1 and less than or equal to 1, and a third group in which the value of the first hidden variable is greater than 1 based on response values of a plurality of users, (vi) repeating the (v) with respect to each of the p hidden variables, and (vii) calculating $S_i$ that minimizes response values of a plurality of users according to Equation 5 with respect to the $k=3^P$ taste groups that are generated by the (vi), $$V = \sum_{i=1}^{3^P} \sum_{j \in S_i} |x_j - \mu_i|^2 \quad \text{[Equation 5]}$$

where V denotes the response values, i denotes an index that represents each of the taste groups, $S_i$ denotes a set of users included in an i-th taste group, $x_j$ denotes a response value of a j-th user included in $S_i$, and $\mu_i$ denotes an average response value of users included in $S_i$.

* * * * *